(12) United States Patent
Piou

(10) Patent No.: US 10,863,662 B2
(45) Date of Patent: Dec. 15, 2020

(54) PNEUMATIC ELEMENT FOR AN AGRICULTURAL TOOL COMPRISING A RIGID BASE

(71) Applicant: OTICO, Chalmaison (FR)

(72) Inventor: Denis Piou, Villeblevin (FR)

(73) Assignee: OTICO, Chalmaison (FR)

( * ) Notice: Subject to any disclaimer, the term of this patent is extended or adjusted under 35 U.S.C. 154(b) by 58 days.

(21) Appl. No.: 15/714,168

(22) Filed: Sep. 25, 2017

(65) Prior Publication Data

US 2018/0092283 A1    Apr. 5, 2018

(30) Foreign Application Priority Data

Sep. 30, 2016 (FR) ..................... 16 59462

(51) Int. Cl.
*A01B 29/04* (2006.01)

(52) U.S. Cl.
CPC .................. *A01B 29/043* (2013.01)

(58) Field of Classification Search
CPC ..... A01B 29/043; A01B 29/00; A01B 29/002; A01B 29/04; A01B 29/041
See application file for complete search history.

(56) References Cited

U.S. PATENT DOCUMENTS

| | | | | |
|---|---|---|---|---|
| 1,862,269 A * | 6/1932 | Johnson | ..................... | B60C 3/02 152/384 |
| 4,362,202 A * | 12/1982 | Sacks | ........................ | B60C 3/02 152/158 |
| 4,493,355 A * | 1/1985 | Ippen | ..................... | B29D 30/02 152/310 |
| 9,867,327 B2 * | 1/2018 | Phely | ..................... | A01C 5/068 |
| 10,207,543 B2 * | 2/2019 | Phely | ................... | B60C 17/009 |

FOREIGN PATENT DOCUMENTS

| | | | | |
|---|---|---|---|---|
| CA | 2979170 A1 * | 3/2018 | ........... | A01B 29/043 |
| DE | 3815279 A1 * | 11/1989 | ........... | A01B 29/043 |
| DE | 102 15 477 A1 | 10/2003 | | |
| DE | 102017002727 A1 * | 9/2018 | ............ | A01B 29/04 |
| EP | 2116119 A1 * | 11/2009 | ........... | A01B 29/043 |
| EP | 2 269 431 A1 | 1/2011 | | |
| EP | 2 269 431 B1 | 1/2011 | | |
| FR | 2 776 239 | 9/1999 | | |
| FR | 2776239 A1 * | 9/1999 | ........... | A01B 29/043 |
| FR | 2789940 A1 * | 8/2000 | ........... | A01B 29/043 |
| FR | 2946221 A1 * | 12/2010 | ........... | A01B 29/043 |

OTHER PUBLICATIONS

French Preliminary Search Report dated May 11, 2017 in French Application 16 59462, filed on Sep. 30, 2016 (with English Translation of Categories of cited documents).

* cited by examiner

*Primary Examiner* — Jamie L McGowan

(74) *Attorney, Agent, or Firm* — Oblon, McClelland, Maier & Neustadt, L.L.P.

(57) ABSTRACT

An agricultural tool element includes a non-inflated tire with a tread and a pair of sidewalls each connected to the tread at a respective first end portion. The element additionally includes a rigid, generally annular base on which the tire is fitted on a rotary support of an agricultural tool. The sidewalls are each over-molded on a peripheral portion of the rigid base at a second end portion, opposite the tread.

13 Claims, 8 Drawing Sheets

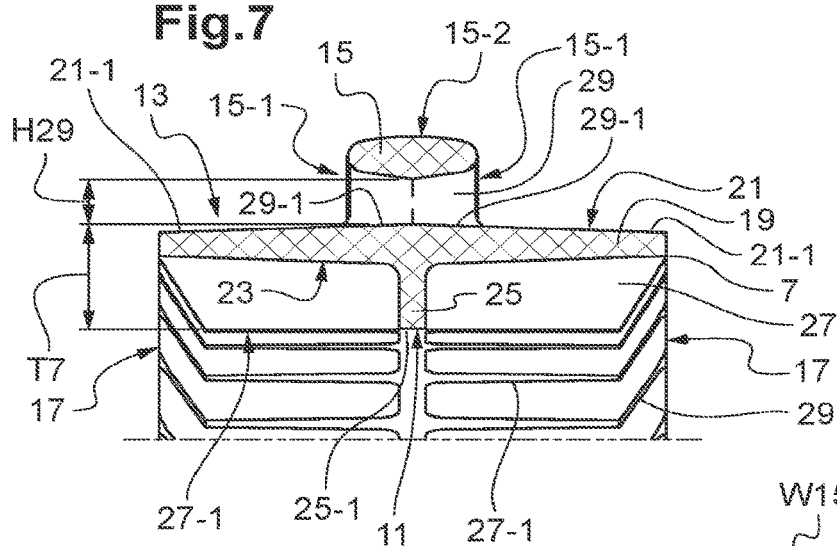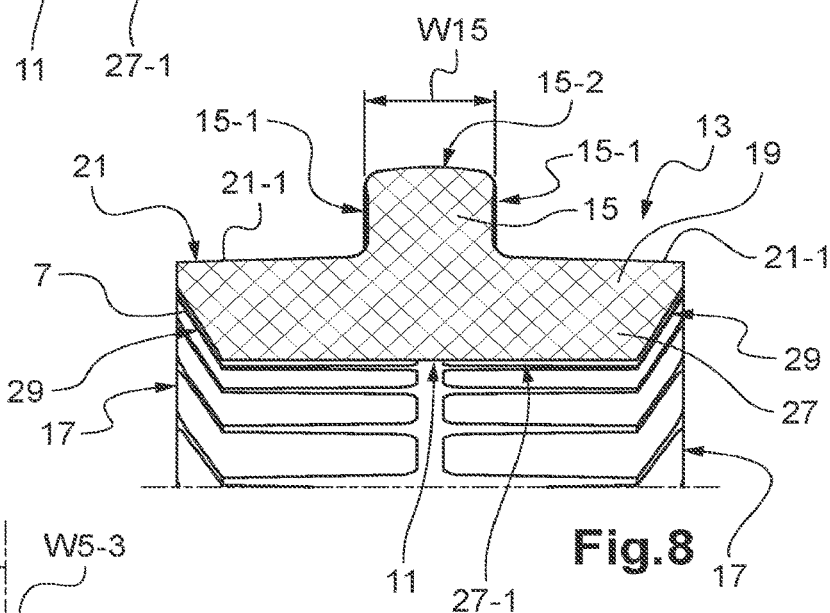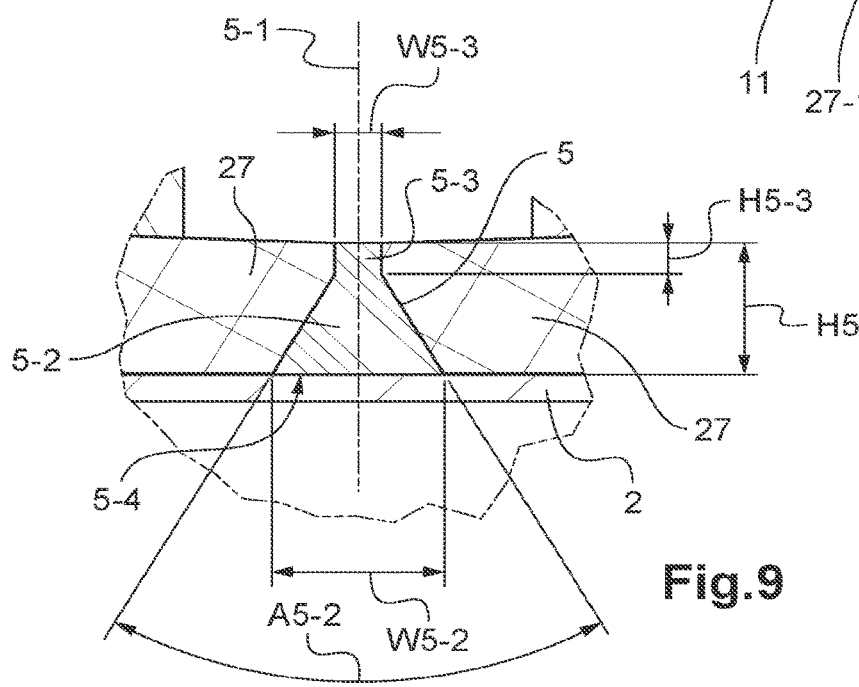

Fig.12
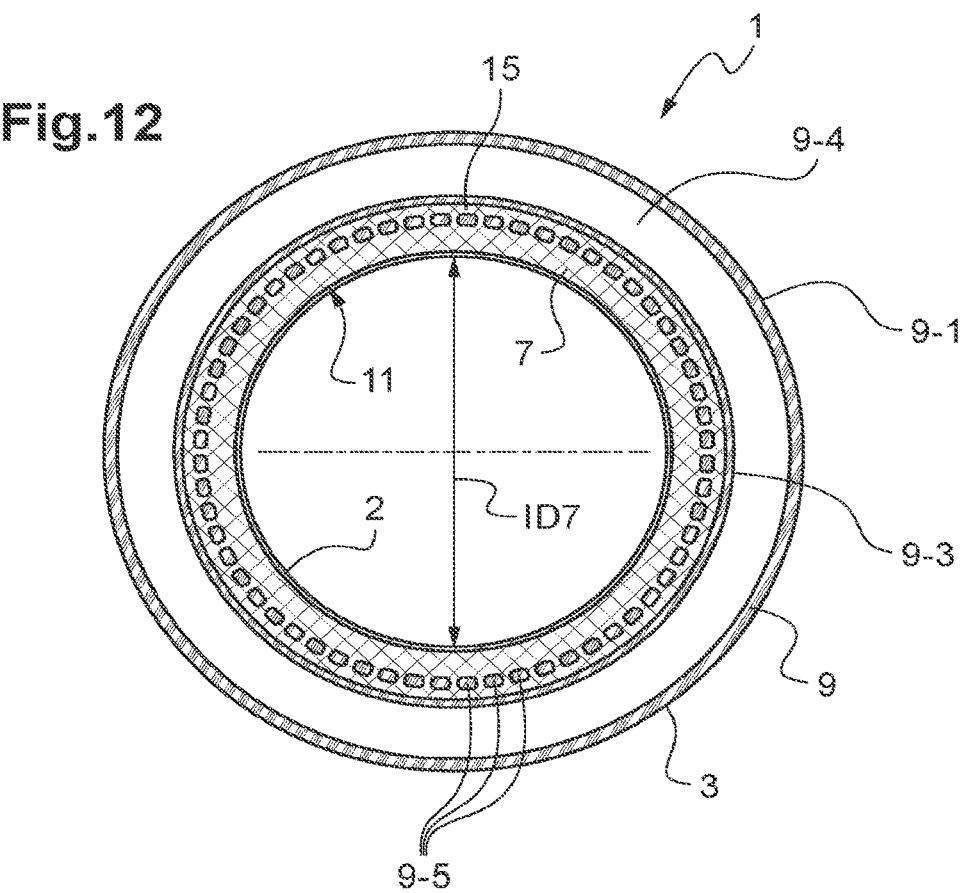
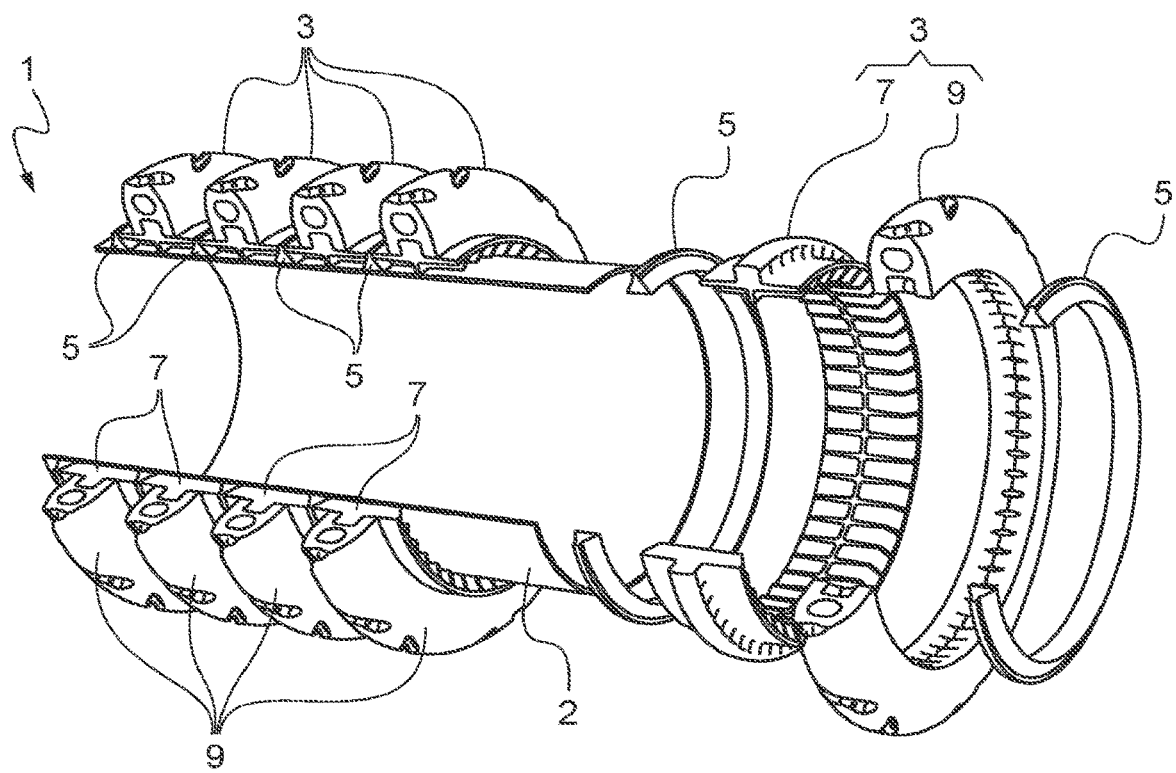
Fig.13

PNEUMATIC ELEMENT FOR AN AGRICULTURAL TOOL COMPRISING A RIGID BASE

The invention relates to a pneumatic element for an agricultural tool, and more particularly to an element of the type comprising a non-inflated tire with a tread and a pair of sidewalls which are each connected to the tread at a respective first end portion.

Pneumatic elements of this type can be fitted on a rim or a support tube in order to form an agricultural tool in the form of a wheel or a roller. The resulting agricultural tool is used for working fields, in particular for forming furrows in them or closing the furrows.

The elements are arranged adjacent to one another with a pitch which corresponds to the spacing of the furrows and/or drills from one another.

In certain working conditions, for example when the earth is sticky or in the presence of mud, the agricultural tools, and in particular their pneumatic elements, become clogged. This clogging reduces the working performance of the tools. The clogging also damages the tools themselves by premature wear of the parts which constitute them, and/or a tendency to separate the parts from one another, and in particular separate the tires from the remainder of their element.

For a long time now, the applicant has been working on structural arrangements which allow the pneumatic elements to clean themselves when working. The objective is for example to increase the capacity to be deformed of the tires in order to assist detachment of the earth or mud.

In its patent application in France published under number FR 2 997 653 for example, the applicant proposed a tire, the profile of which has a point of inflection on the sidewalls. This point of inflection allows the tire to collapse on itself in operation, thus detaching the mud which has accumulated on this tire, and in particular on its sidewalls.

Increasing the capacity to be deformed of the tire is in general not sufficient to provide a functional agricultural tool. This tire must also be sufficiently rigid to work the earth, and the pneumatic elements must withstand the impacts which can occur during work and the forces which are exerted on them, in particular when the roller or wheel has to negotiate a bend. The pneumatic elements must also continue to be inexpensive to produce, and be easily replaceable, in the event of damage in particular.

The applicant has decided to go even further, and to address the clogging of the volumes situated between the tires of an agricultural tool, whether these equip agricultural tools in the form of rollers or wheels.

For this purpose the applicant proposes an agricultural tool element of the type comprising a non-inflated tire with a tread and a pair of sidewalls each connected to the tread at a respective first end portion. The element additionally comprises a rigid, generally annular base, by means of which the tire is fitted on a rotary support of an agricultural tool, and the sidewalls are each over-molded on a peripheral portion of the rigid base at a second end portion, opposite the tread.

Thanks to the distinctive configuration of the pneumatic element proposed, its tire and base can be made of different materials from one another. The tire can be made of a flexible material, which provides it with a good capacity for deformation and good working efficiency. The tire can be designed such as to clean itself. The base can be made of a rigid material, at least in comparison with the material of the tire. The base thus has the rigidity and strength necessary to withstand the forces and impacts which occur when the tool is functioning. The configuration of the base and the material from which it is made can be selected jointly, such as to dispense with additional reinforcement parts. In particular, the material of the base can be selected from materials which are impervious to adhesion of mud, or are treated for this purpose. The base can be made of plastic material.

The pneumatic element proposed has good circumferential rigidity and good surface flexibility. The cohesion between the flexible part of the element, which comprises a radially outer portion of the tire, and the rigid part of this element which comprises the base, is ensured by the particular fitting of the tire on the base, which comprises over-molding of the tire on the base.

The pneumatic element proposed is lighter than the conventional elements wherein the element is without a base, and/or is produced integrally with the tire, and reinforcements, which are generally made of metal, are used in the tread of the tire.

Other characteristics and advantages of the invention will become apparent from examining the following detailed description and the appended drawings, in which:

FIG. 7 represents the base in FIG. 5, in cross-section according to the line VII-VII;

FIG. 8 represents the base in FIG. 5, in cross-section according to the line VIII-VIII;

FIG. 9 represents a detail IX of the roller in FIG. 2;

FIGS. 10 to 12 are similar to FIGS. 2 to 4 respectively, and represent an agricultural roller according to a first variant embodiment;

FIGS. 13 to 15 are similar to FIGS. 2 to 4 respectively, and represent an agricultural roller according to a second variant embodiment;

The appended drawings contain elements of a certain character. They can not only be used to complete the invention, but also contribute towards its definition, if applicable.

Figure 1:
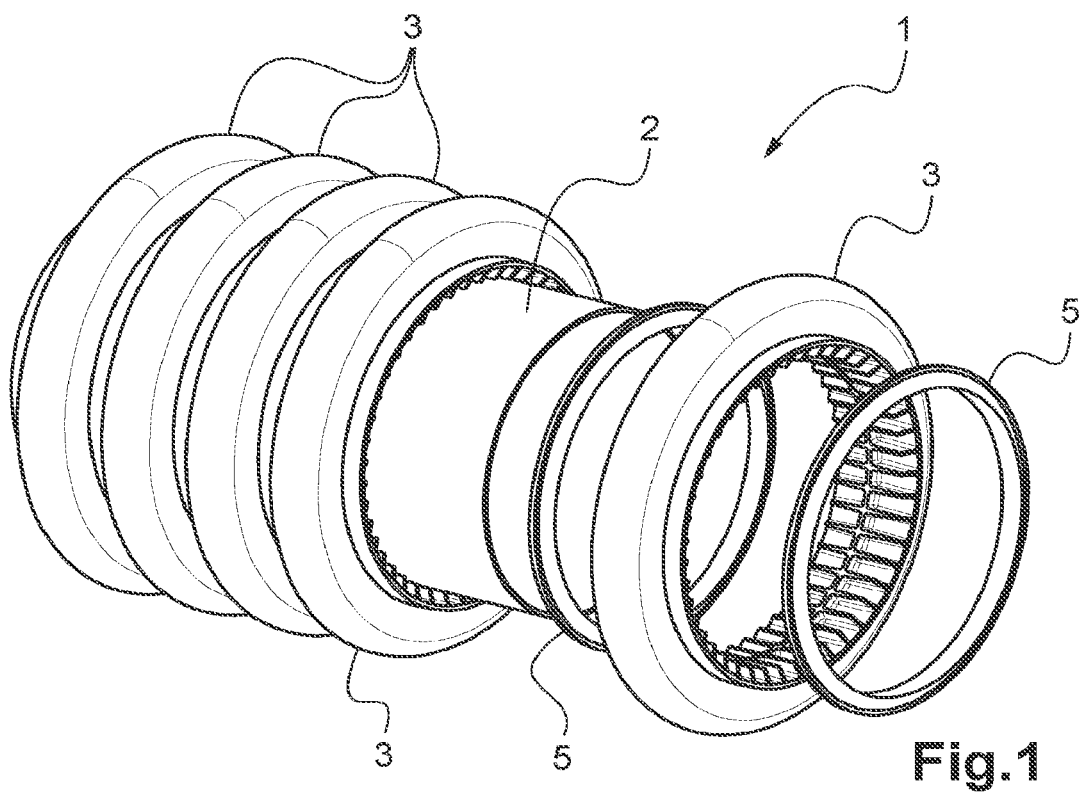
FIG. 1 represents an agricultural roller seen in partially exploded isometric perspective.

Reference is made to FIG. 1.

The figure shows an example of an agricultural tool in the form of a roller 1. The roller 1 comprises an elongate support tube 2 and a plurality of generally annular pneumatic elements 3. The pneumatic elements are fitted on the support tube 2 according to its longitudinal direction. Each pneumatic element 3 comprises two large lateral faces which are generally parallel to one another.

The roller 1 also comprises a plurality of generally annular braces 5. The braces 5 are fitted on the support tube 2 according to its longitudinal direction. In each case, a brace 5 is interposed between two large faces of two adjacent pneumatic elements 3.

The lateral faces of the pneumatic elements 3 are in contact with one another by means of the braces 5. The roller 1 also comprises two flanges, not represented, each fitted on the support tube 2 at a respective end of the stack of pneumatic elements 3. The flanges are arranged such that the pneumatic elements 3 are pressed against one another, whilst compressing the braces 5. The resulting force applied on the end flanges can be approximately a ton (10,000 N).

Figure 2:
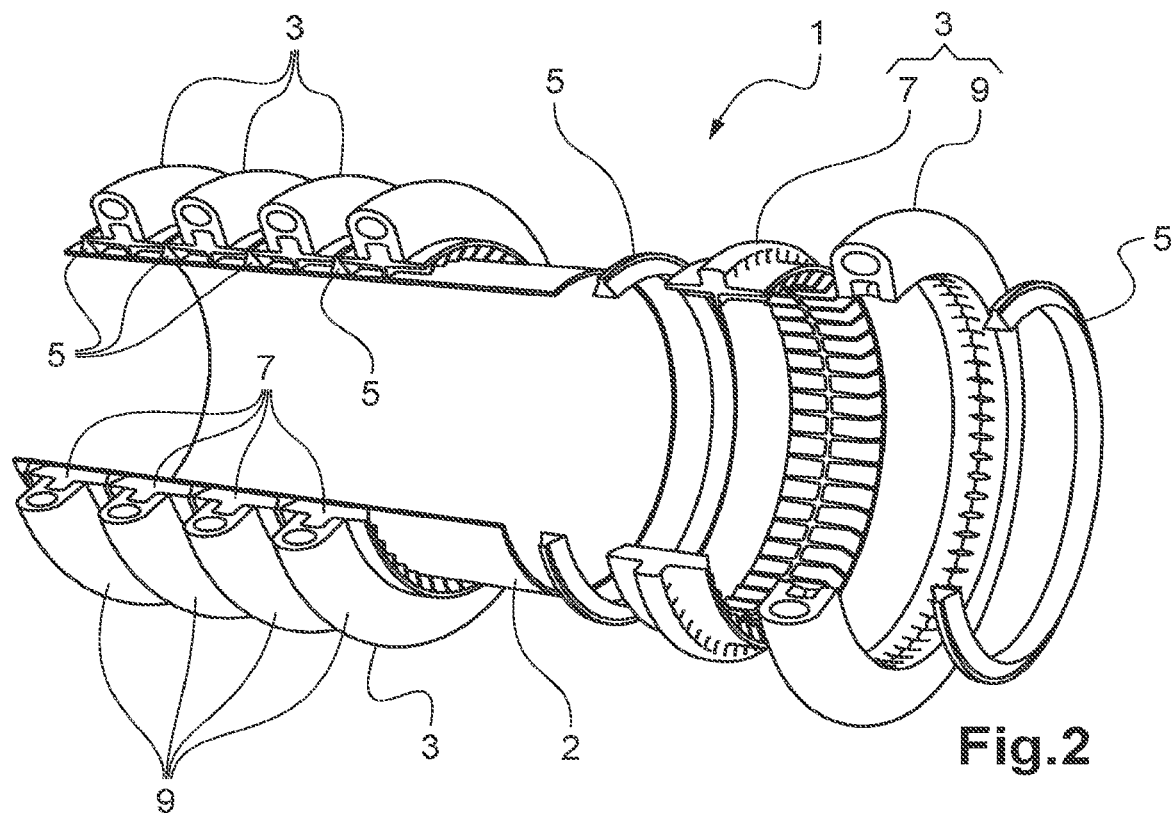
FIG. 2 represents the roller in FIG. 1 in partially cut-out and exploded isometric perspective.
Figure 3:
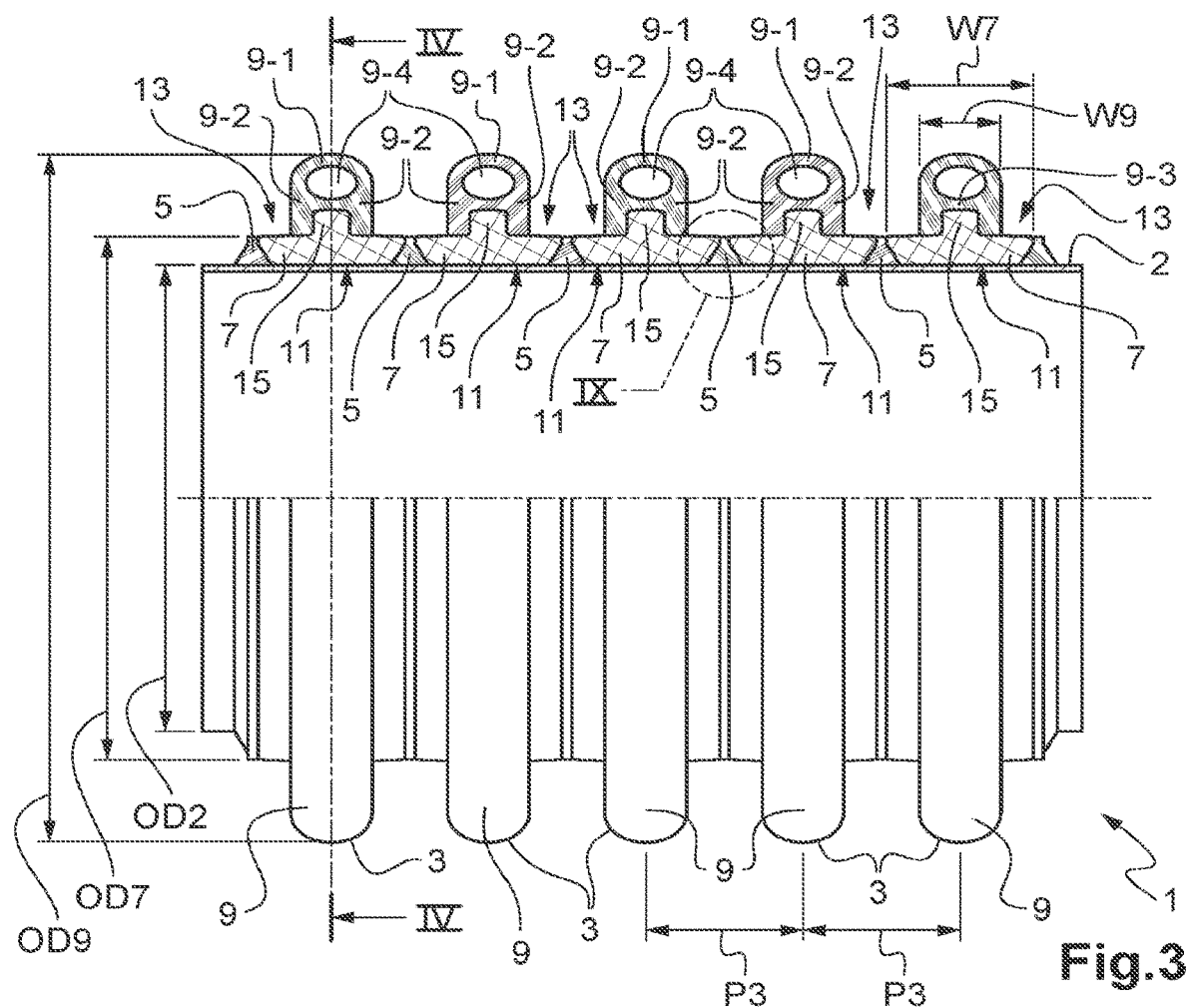
FIG. 3 represents the roller in FIG. 1, seen in longitudinal half cross-section.
Figure 4:
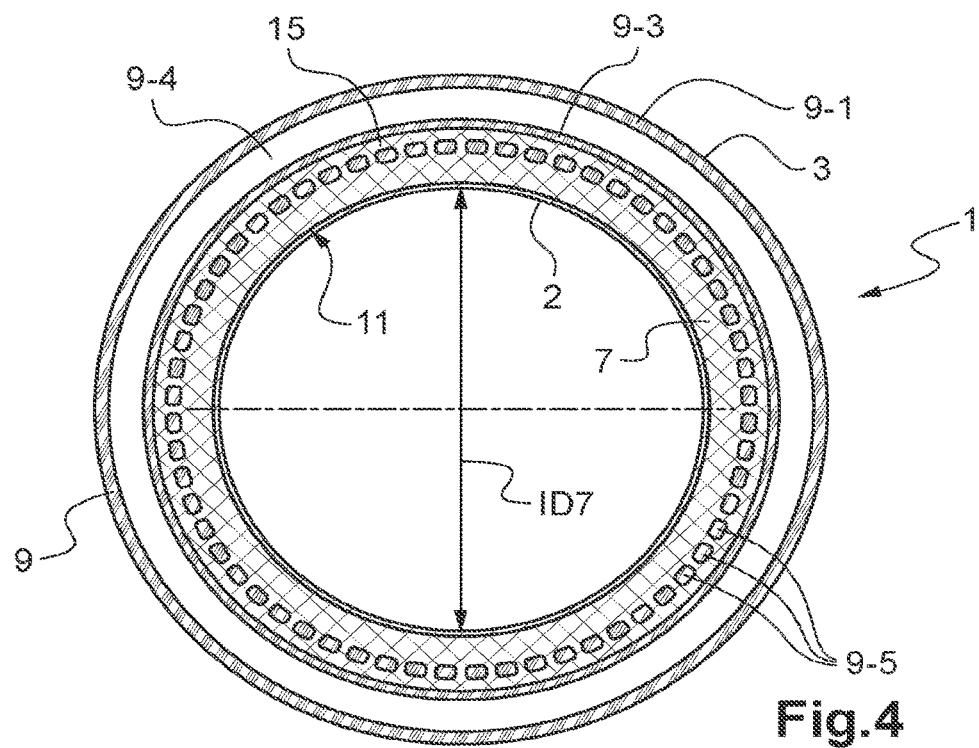
FIG. 4 represents the roller in FIG. 1 in transverse cross-section, according to the line IV-IV.

Reference is made to FIGS. 2 to 4.

Each pneumatic element 3 comprises a generally annular base 7 and a tire 9 which is coupled on the base 7.

The base 7 has an inner face 11 by means of which the pneumatic element 3 is fitted on the support tube 2, and an outer face 13, which is radially opposite the inner face 11, and on which the tire 9 is coupled.

The tire 9 comprises a portion which forms a tread 9-1, and two portions which form sidewalls 9-2, which are generally parallel to one another and connected at one of their respective ends to the tread 9-1. The sidewalls 9-2 extend generally radially. In this case, the sidewalls 9-2 meet one another at an approximately median portion 9-3. This median portion 9-3, the tread 9-1 and the sidewall part 9-2 which connect the median part 9-3 to the tread 9-1 jointly delimit a chamber 9-4. This chamber 9-4 is in fluid communication with the exterior of the tire 9 by means of an orifice, not represented. The tire 9 is of the non-inflated and semi-hollow type.

In this case, the tread 9-1 has a profile which is slightly curved radially towards the exterior of the tire 9. The chamber 9-4 has an oval profile. The curvature of the tread 9-1 corresponds to a half-oval.

The tire 9 is made of flexible material, for example of elastomer, rubber, and/or polyurethane. In particular, the Shore hardness of the material of the tire 9 is between 50 HRC and 75 HRC. The tire 9 can be deformed in use. The base 7 is made of rigid material, for example a thermoplastic material.

The base 7 has a peripheral rib, or outer rib 15 which projects from its outer face 13, and extends circumferentially. In this case, the outer rib 15 extends in a median area of the base 7.

Figure 5:
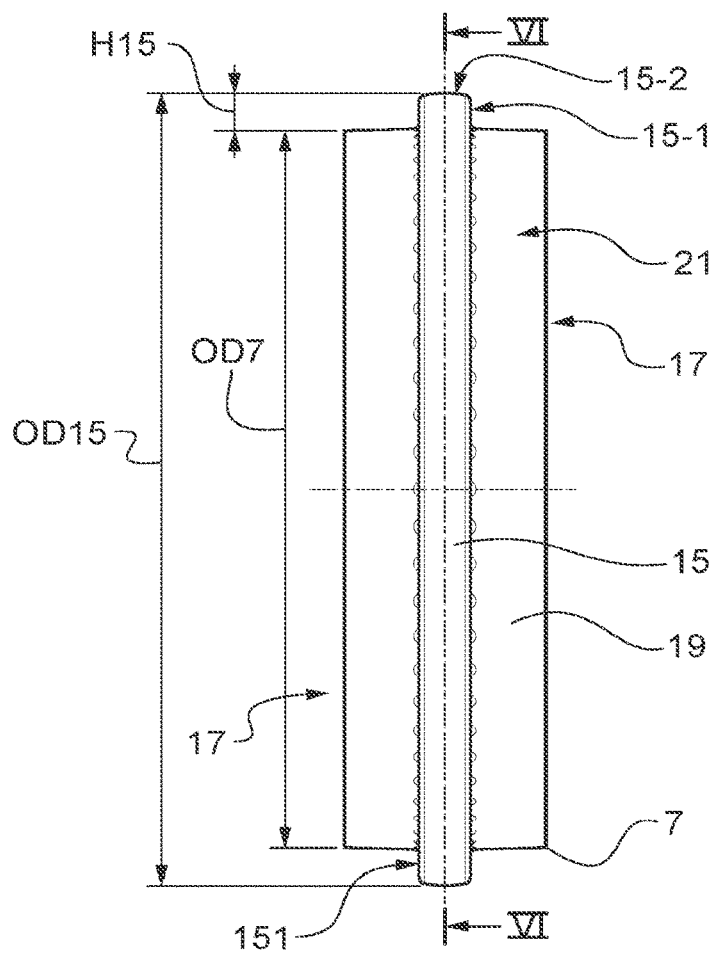
FIG. 5 represents a base for the roller in FIG. 1, seen from the front.
Figure 6:
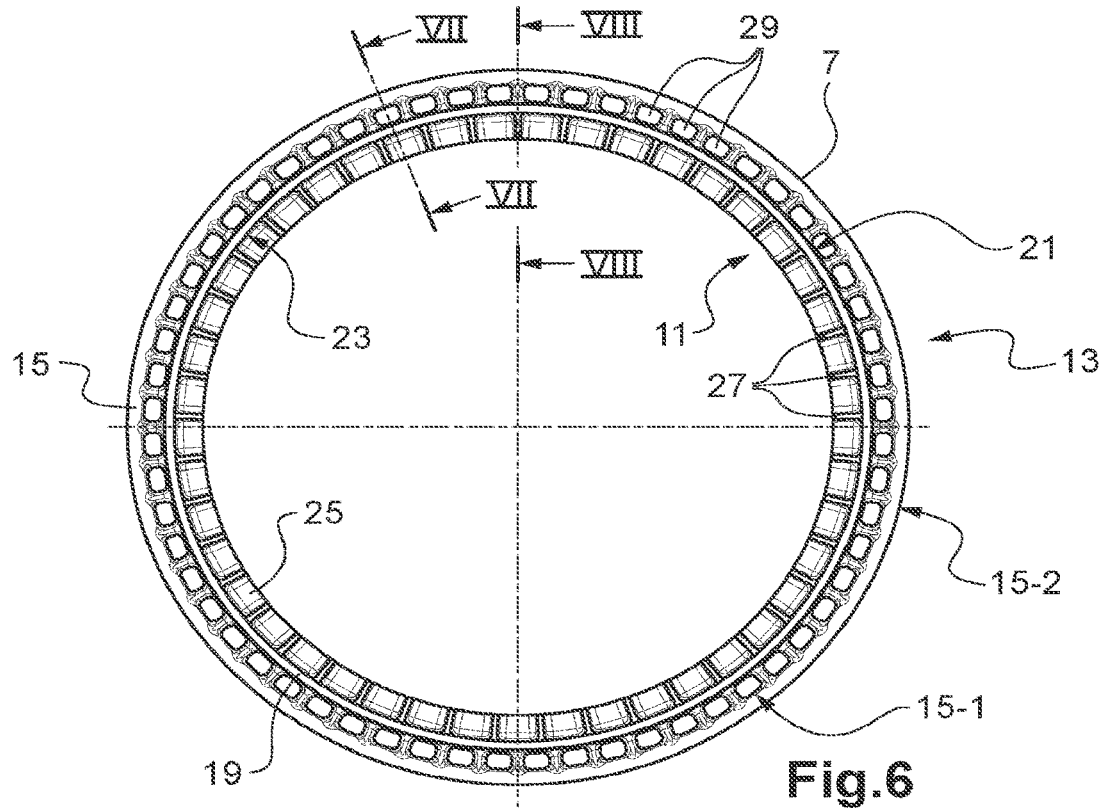
FIG. 6 represents the base in FIG. 4, in cross-section according to the line VI-VI.

The tire 9 is coupled on the outer rib 15. The outer rib 15 has two flanks 15-1 (shown in FIG. 5) connected to one another by a strip which forms a top 15-2 (shown in FIG. 5). The flanks 15-1 of the outer rib 15 each have a straight profile. These flanks 15-1 extend substantially radially. The top 15-2 has a slightly curved profile. By means of this convex form of the top 15-2, the forces which are applied to the tire 9 during work are directed on the lateral portions of the base 7.

The sidewalls 9-2 of the tire 9 are coupled on the flanks 15-1 of the outer rib 15, whereas the median portion 9-3 of the tire 9 comes into contact with the top 15-2 of the rib 15. The sidewalls 9-2 of the tire 9 are coupled on a part which goes from their median portion 9-3 to their end opposite the tread 9-1. This part of the sidewalls 9-2 of the tire 9 and the median portion 9-3 are arranged such as to form a circumferential groove in the tire 9. The profile of this circumferential groove corresponds to the profile of the outer rib 15. This results in a cooperation of form which contributes to the assembly to one another of the tire 9 and the base 7. The sidewalls 9-2 of the tire 7 are coupled along the entire height of the flanks 15-1 of the outer rib 15. The ends of the sidewalls 9-2 of the tire 9 which are spaced from the tread 9-1 are in contact with the remainder of the base 7, at the outer face 13 of the latter.

The tire 9 is produced in a single piece.

The following table shows a set of measurement values for the tool 1 in FIGS. 1 to 4, purely by way of example.

| part | measurement | reference | value |
| --- | --- | --- | --- |
| support tube 2 | outer diameter | OD2 | 406.4 mm |
| base 7 | inner diameter | ID7 | 407 mm |
| base 7 | outer diameter | OD7 | 456 mm |
| base 7 | width | W7 | 117 mm |
| tire 9 | outer diameter | OD9 | 600 mm |
| tire 9 | width | W9 | 65 mm |
| pneumatic element 3 | pitch | P3 | 125 mm |

The outer diameter of the base 7 extends from the outer rib 15.

Reference is made to FIGS. 5 to 8.

The base 7 has two large lateral faces 17 which are parallel to one another. The lateral faces 17 each connect the inner face 11 to the outer face 13. The base 7 comprises a generally tubular body 19, which extends between the lateral faces 17. The body 19 has an outer surface 21 which corresponds to the outer face 13 of the base 7, and a generally cylindrical inner surface 23 which is radially opposite the outer surface 21.

The outer rib 15 is connected to the outer surface 21 of the body 19. The flanks 15-1 of the outer rib 15 extend substantially radially. The base 7 comprises a plurality of grooves which project radially from the inner surface 23 of the body 19 to the inner face 11 of the base 7 by means of which the base 7 is fitted on a support tube.

In this case, the base 7 comprises a second rib, or inner rib 25, which projects radially from the inner surface 23, and extends circumferentially on this inner surface 23.

The base 7 also comprises a plurality of third ribs, or axial ribs 27, which project radially from the inner surface 23 of the body 19, and extend generally axially. The axial ribs 27 each connect the inner rib 25 to one or the other of the lateral faces 17 of the base 7. The axial ribs 27 are distributed regularly angularly on the inner surface 23 of the body 19.

Each axial rib 27 is connected at one of its longitudinal ends to the inner rib 25. Each longitudinal rib 27 has a free end 29 opposite the inner rib 25. This free end 29 is beveled, such that this free end 29 widens towards the exterior in the radial direction. In this case, the free end 29 corresponds to a lateral face of the base 7, in the location where it is connected to the body 9. Each axial rib 27 thus has the form of a straight trapezium, the large base of which is connected to the body 19, on the inner surface 23 of the latter, and the small base coincides with the inner face 11 of the base 7.

The inner rib 25 has a top ridge 25-1, by means of which the base 7 comes into contact on the exterior with the wall of a support tube, for example the support tube 2 in FIGS. 1 to 4. Each axial rib 27 thus has a top ridge 27-1 by means of which the base 7 comes into contact on the exterior with the wall of a support tube, for example the support tube 2 in FIGS. 1 to 4.

The axial ribs 27 and the inner rib 25 ensure guiding along the base 7 on the support tube. The axial ribs 27 and the inner rib 25 strengthen the body 19. They also form jointly a network of ribs which provides the base 7 with an alveolar structure with a mass which is quite small in relation to its strength.

The outer rib 15 has a generally rectangular profile, which in this case is almost square. The rib 15 has a plurality of recesses 29 which open onto the flanks 15-1 of the outer rib 15. These recesses 29 contribute towards coupling the tires 9 on the base 7, in particular when this coupling is carried out by over-molding the tire 9 on the base 7. The material which forms the tire 9 penetrates into each of the recesses 29 during the molding. As it solidifies, the material forms there a shape similar to a hook which retains the tire 9 on the outer rib 15.

In this case, each recess 29 opens onto each of the flanks 15-1 of the outer rib 15. The recesses 29 are in the form of orifices which extend generally according to the axial direction of the base 7. These orifices give rise to a junction of material 9-5 (shown in FIG. 4) between the sidewalls 9-2 of the tire 9 during the over-molding. This junction 9-5 is situated on an end portion of the sidewalls 9-2 of the tire 9 opposite the tread 9-1. The junction 9-5 strengthens greatly the assembly of the tire 9 and the base 7 to one another. This junction 9-5 also consolidates the tire 9. This junction 9-5 acts in the manner of a rivet which passes through the sidewalls 9-2 and the outer rib 15 of the base 7.

In this case, each recess 29 is in the form of two frusto-conical portions 29-1 which are connected to one another on a median plane of the base 7, and widen in the direction of the flanks 15-1 of the outer rib IS. During the over-molding of the tire 9, this frusto-conical form guides the material towards the median plane of the base 7.

The recesses 29 are formed at the base of the rib 15, in order not to weaken this rib 15.

The outer surface 21 of the body 19 has a profile which is slightly inclined relative to the axial direction of the base 7. This outer surface 21 has two frusto-conical portions 21-1 with quite a small angle at the top. Each frusto-conical portion 21-1 narrows going from the median plane of the base 7 towards a respective lateral face 17 of this base 7. This inclination makes it possible to discharge the mud or earth from the tires 9 to a part of the base 7 where they detract least from the performance of the tool.

The base 7 is made in a single piece.

The following table gives a set of measurement values for the base 7 in FIGS. 5 to 8. This set of values is compatible with the tool 1 in FIGS. 1 to 4. It is therefore provided purely by way of example.

| portion | measurement | reference | value |
| --- | --- | --- | --- |
| rib 15 | width | W15 | 30 mm |
| rib 15 | height | H15 | 22.2 mm |
| base 7 without rib 15 | thickness | T7 | 26.5 mm |
| recess 29 | height | H29 | 11.5 mm |
| rib 15 | outer diameter | OD15 | 504.4 mm |

Reference is made to FIG. 9.

The brace 5 has a form which is symmetrical relative to a median plane 5-1. The brace 5 has two large lateral faces which are parallel to one another. Each lateral face of the brace 5 is designed such as to correspond in form with the lateral face of a base 7.

The brace 5 has a radially inner portion 5-2, and a radially outer portion 5-3 which is connected to the inner portion 5-2. The inner portion 5-2 has a profile in the form of an isosceles trapezium. The large base of this trapezium performs an inner surface 5-4 of the brace 5, by means of which this brace 5 comes into contact with the wall of the support tube 2. The sides of this trapezium are inclined relative to the radial direction, in a manner corresponding to the free ends of the longitudinal ribs 27. The outer portion 5-3 has a generally square profile, the side of which corresponds to the small base of the inner portion 5-2.

The following table gives a set of measurement values for the brace 5 in FIG. 9. This set of values is compatible with the tool 1 in FIGS. 1 to 4. It is provided purely by way of example.

| portion | measurement | reference | value |
| --- | --- | --- | --- |
| interior 5-2 | maximum width | W5-2 | 30 mm |
| interior 5-2 | inclination of the flanks | A5-2 | 60° |
| exterior 5-3 | width | W5-3 | 8 mm |
| exterior 5-3 | height | H5-3 | 6 mm |
| assembly | height | H5 | 24.8 mm |

When the pneumatic elements 3 are fitted on the tube 2, and above all during the clamping, the trapezoidal form of the braces 5 cooperates with the beveled form of the longitudinal ribs 27 in order to make the material of the braces 5 flow into the alveoles of the bases 7 and below the axial ribs 27. Consequently, the braces 5 make the bases 7 adhere to the outer wall of the support tube 2. This adhesion opposes the movements of relative rotation of these bases 7 around the support tube 2. Movements of this type tend to occur during work, in particular when the roller 1 turns. This cooperation of form between the braces 5 and the lateral faces 17 of the bases 7 also ensures sealing of the assembly along the length of the roller 1. This sealing prevents mud, earth, or dirt from penetrating from the exterior between the bases 7 and the support tube 2.

Figure 10:
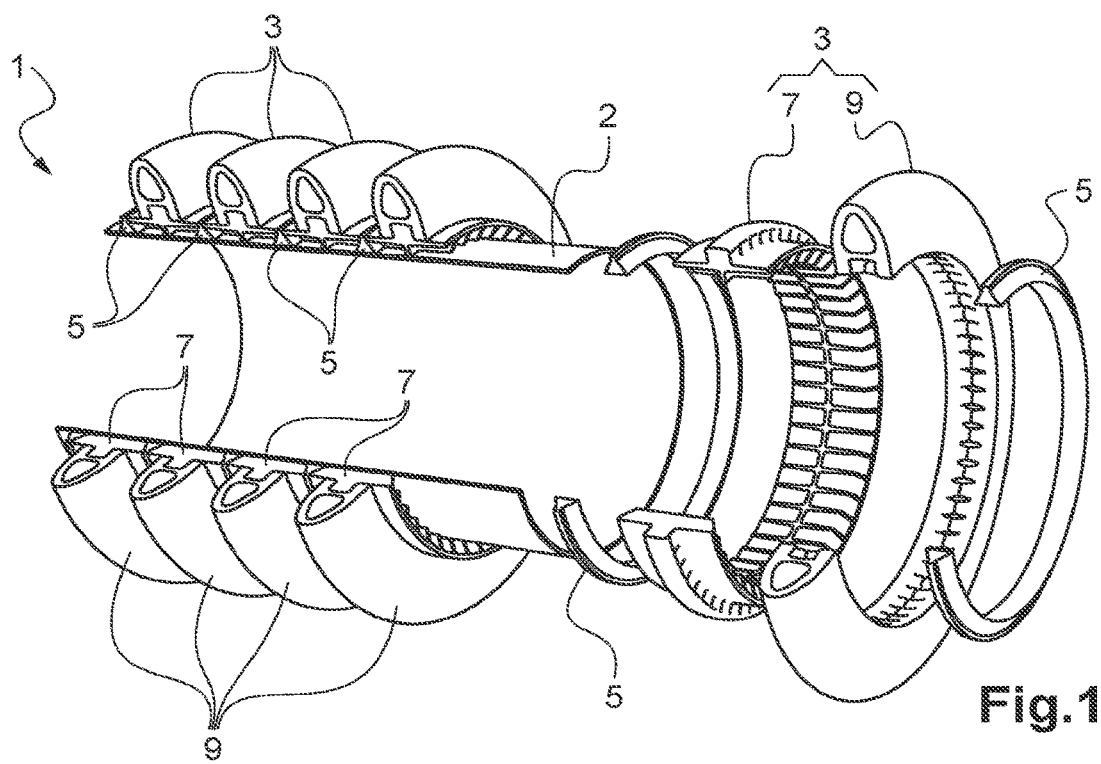
Figure 11:
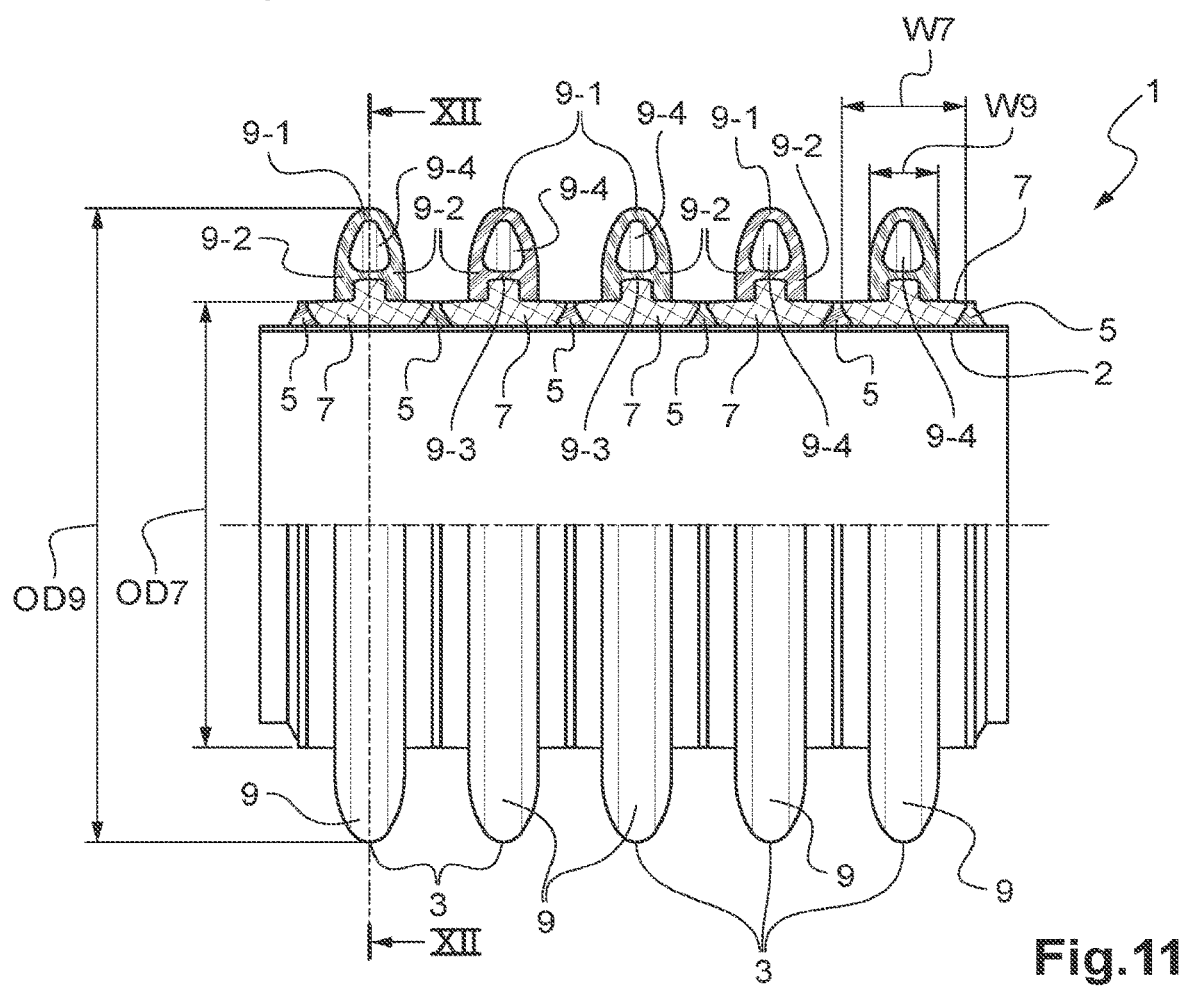

Reference is made to FIGS. 10 to 12.

Similar functional elements bear numerical references which are identical to FIGS. 2 to 4.

The agricultural roller 1 is distinguished from that in FIGS. 2 to 4 by the form of the tire 9 of the elements 3. In this case, the tread 9-1 is narrow. The sidewalls 9-2 are in general straight in relation to the rib 15 of the base 7, then curve, such as to approach one another in the direction of the tread 9-1. The chamber 9-4 has a profile generally of an isosceles triangle, the base of which is shorter than the equal sides. The tires 9 are higher than in the embodiment in FIGS. 1 to 4. For example, their outer diameter OD9 is approximately 650 mm.

Figure 14:
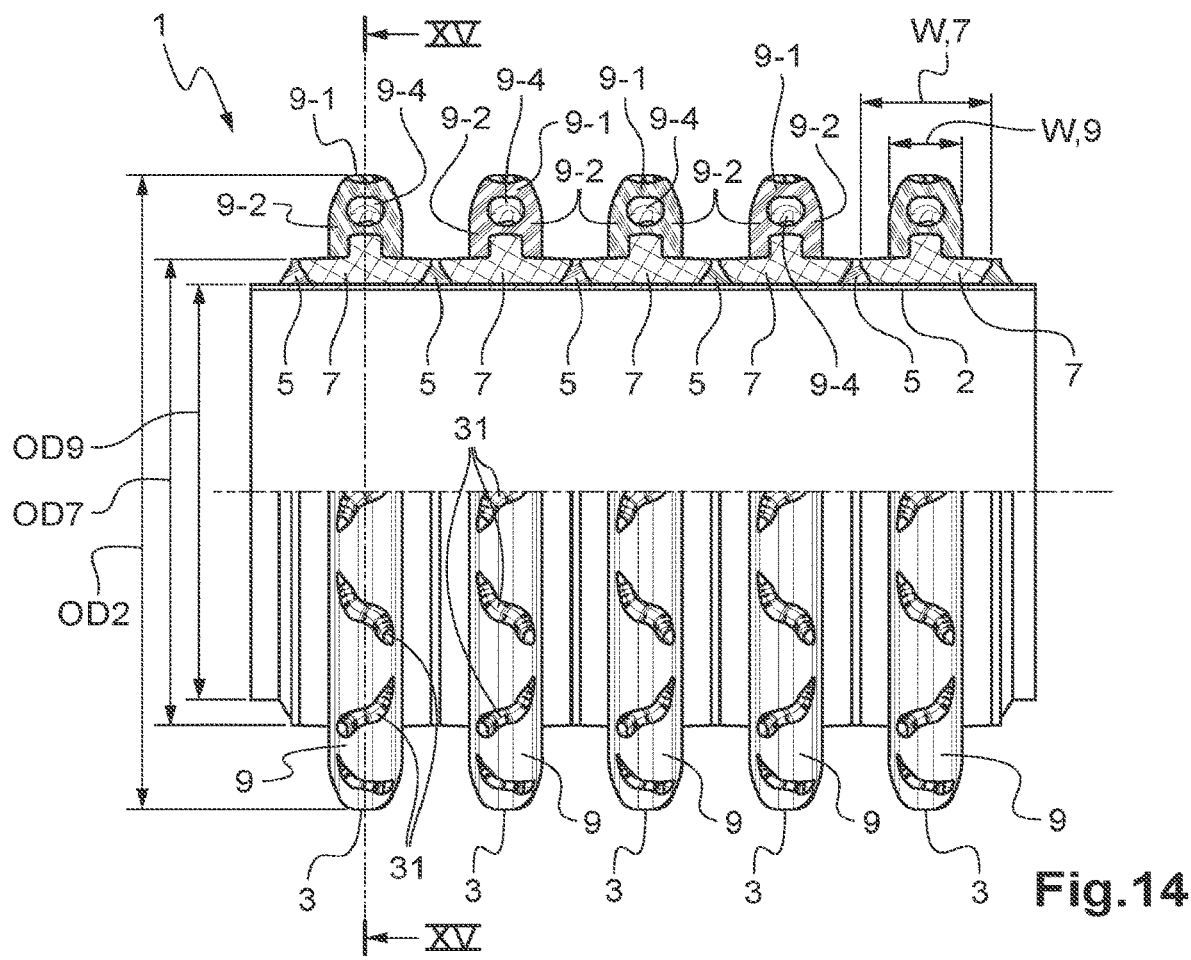
Figure 15:
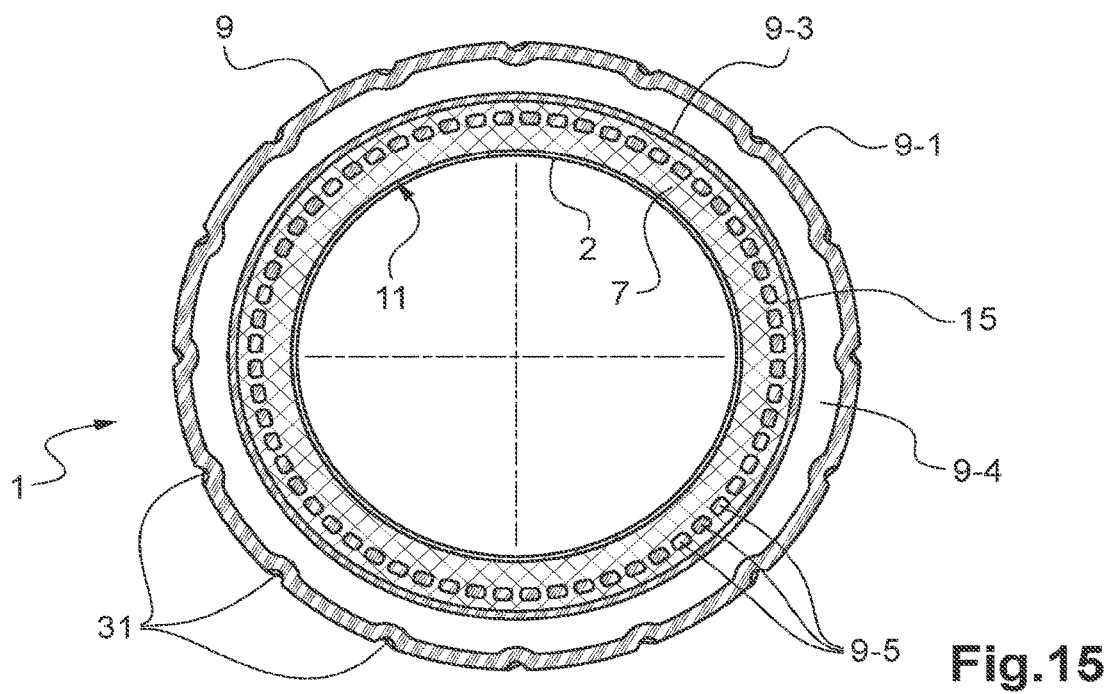

Reference is made to FIGS. 13 to 15.

Similar functional elements bear numerical references which are identical to FIGS. 2 to 4.

The agricultural roller is distinguished from that in FIGS. 2 to 4 by the form of the tire 9 of the elements 3. In this case, the tread 9-1 continues to be quite wide. The sidewalls 9-2 are generally straight in relation to the rib 15 of the base 3, and are then inclined relative to the radial direction, such as to approach one another in the direction of the tread 9-1. The chamber 9-4 has a generally square profile. For example, the outer diameter OD9 of the tires is approximately 620 mm.

The tread 9-1 has patterns 31. These patterns 31 are inclined relative to the axial direction of the tires 9. In addition or as a replacement, the tread 9-1 can have studs, in particular with a profile similar to that of the patterns 31.

Figure 16:
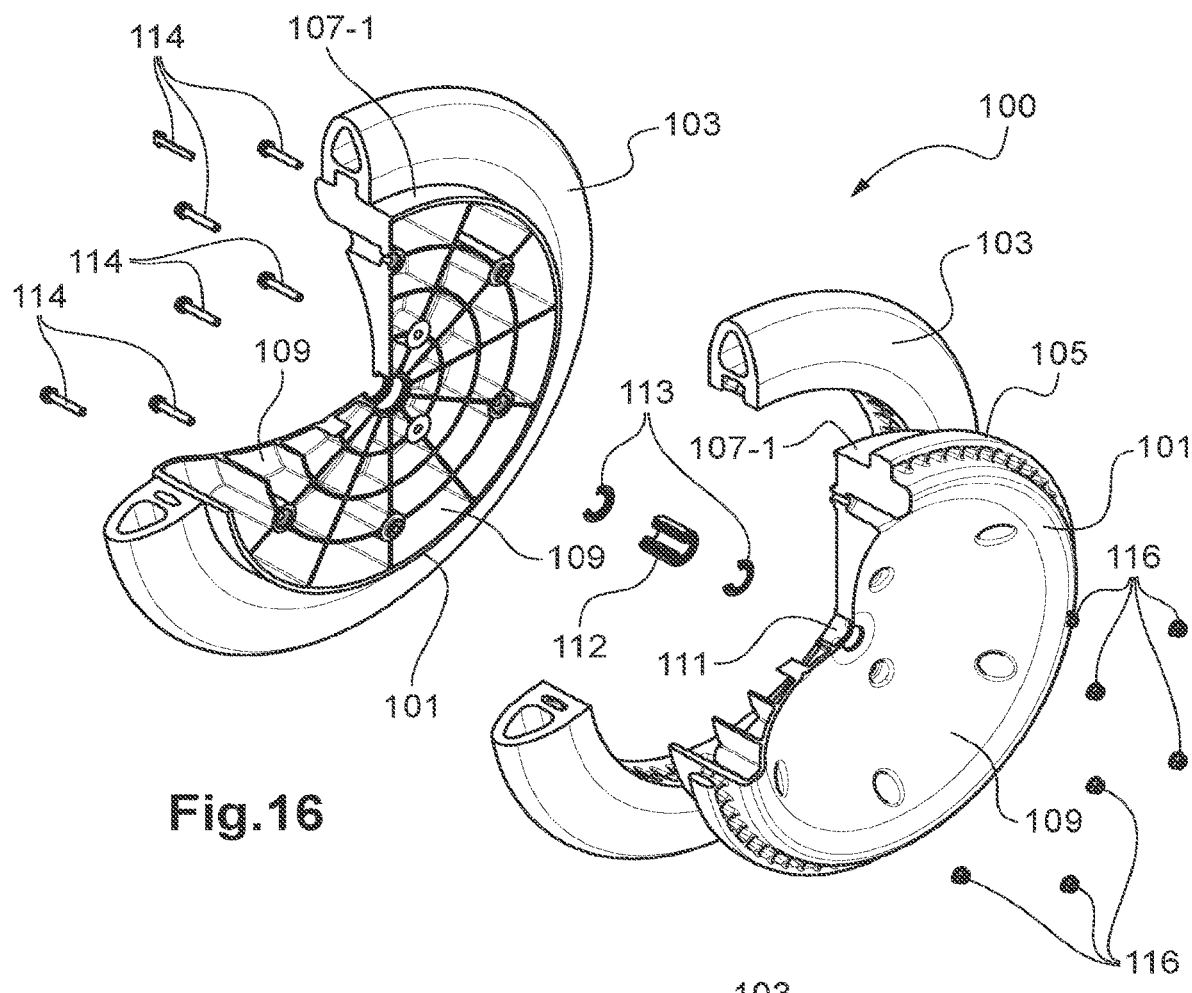
FIG. 16 represents an agricultural wheel, seen in partially cut-out and exploded isometric perspective.
Figure 17:
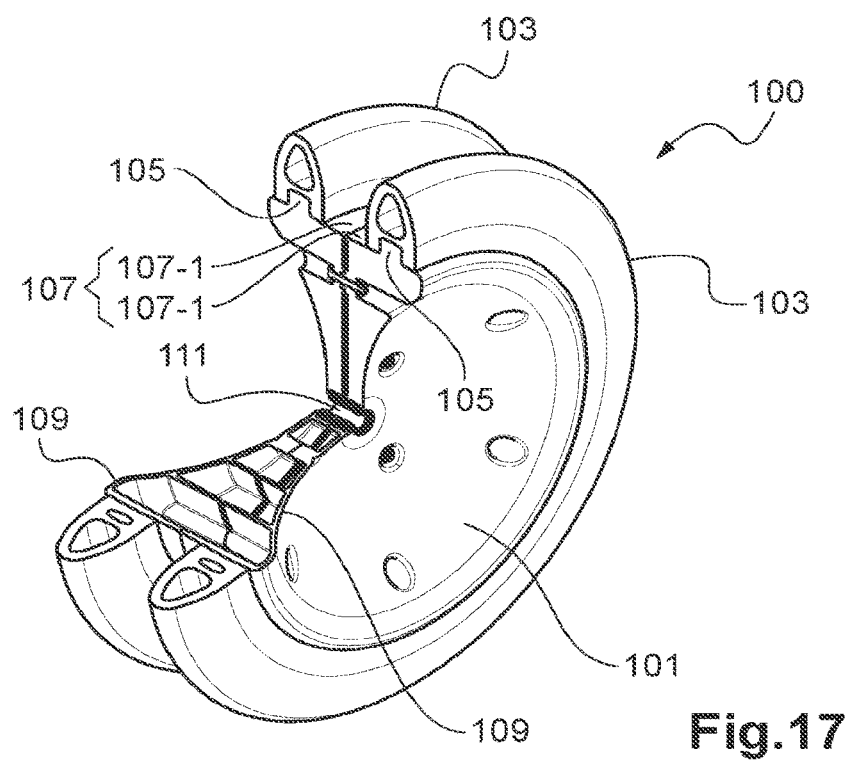
FIG. 17 represents the agricultural wheel in FIG. 16, seen in partially cut-out isometric perspective.

Reference is made to FIGS. 16 and 17.

These figures show an agricultural tool in the form of a wheel 100.

The wheel 100 comprises a rim 101 and a pair of tires 103 which are coupled on the rim 101. In this case, the tires 9 are similar to the tires 9 in FIGS. 10 to 12. The rim 101 forms a rotary support for the tires 103.

The rim 101 has a pair of ribs 105, each similar to the outer ribs 15 in FIGS. 1 to 9. The ribs 105 project radially from the rim 101. The ribs 105 each extend circumferentially. The ribs 105 extend parallel to one another. In each case, a tire 103 is coupled on a respective rib 105 by over-molding, in the manner previously described in relation with FIGS. 1 to 9. The peripheral part of the rim forms a profile base similar to the base 7 in FIGS. 1 to 15.

The rim 101 has an outer surface 107 which is axially inclined, at least on the part of this surface which is between the ribs 105. On this part, the surface 107 has two frusto-conical portions 107-1, which narrow in the direction of one another.

In this case, the rim 101 is produced by assembling a pair of flanges 109 to one another. Each flange 109 has the form of a half-rim. Each flange 109 supports a respective rib 105. The flanges have a solid disk. On their large face opposite the disc, each flange 109 has a network of ribs which provides it with an alveolar structure. The wheel 100 has a hub 111 which is produced by the abutment of respective central orifices in the flanges 109. The hub 111 receives a bearing, in this case in the form of a bearing 112 with double rows of balls. In this case, the bearing 112 is retained by two resilient rings 113 of the circlip type. The flanges 109 can be fitted on one another, and retained firmly in this position by a set of fasteners, in this case each formed by a screw 114 and nut 116 pair.

The invention is not limited to the embodiments described above purely by way of example. In particular:

The outer rib 15 could have more than one row of recesses 29, in particular when this rib 15 has a greater height, in order to receive tires 9 with a more slender profile. In particular, in this case, the outer rib 15 can have two rows of recesses 29 which are each distributed on circles with different diameters. The recesses 29 in these rows can be offset from one another angularly, in particular in order to maintain the strength of the outer rib 15.

Each base 7 can comprise more than one outer rib 15.

At least some of the tires 9 which are coupled on the base 7 can be of the so-called "solid" type, i.e. without a chamber 9-4. The pneumatic elements 3 of a roller 1 can for example have tires 9 which are different from one another. For example, on the support tube 2, there can be an alternation of elements 3 with solid tires 9 and elements 3 with semi-hollow tires 9. The tires 9 of these elements 3 can also have configurations which are different from one another, and/or they can be made of materials which are different from one another. This makes it possible in particular to provide alternation of elements 3 with harder tires 9 and elements with more flexible tires 9.

The profile of the tires 9 described above can be modified according to the application envisaged. In particular, these tires 9 can have a narrower form, in order to form narrower furrows. On the other hand, these tires can also have a wider form. However, the width of a tire 9 should be in proportion with the width of the outer rib 15 on which it is coupled, in particular in order to prevent detachment of the sidewalls 9-2 in an area distant from this rib 15. In the case of very wide tires 9, it is possible to provide coupling on two outer grooves 15 or more.

The outer diameter of the roller can be between 250 and 900 mm. The diameter of the support tube 2 can be between 190 and 750 mm. Its thickness is between 5 and 6.3 mm. The pitch of the tires 9 can have a value in the group formed by 143, 150 and 167 mm.

The invention claimed is:

1. An agricultural tool element comprising:
   a non-inflated tire with a tread and a pair of sidewalls each connected to the tread at a respective first end portion; and
   a rigid, generally annular base, by which the tire is fitted on a rotary support of an agricultural tool,
   wherein the sidewalls are each over-molded on a peripheral portion of the rigid base at a second end portion, opposite the tread,
   wherein the second end portion of the sidewalls is formed at least partly in a radially inner groove in the tire, the peripheral portion of the rigid base comprises a rib, and the groove and the rib are arranged with correspondence of form relative to one another,
   wherein the rib projects from an outer face of the rigid base,
   wherein the rib includes first and second flanks extending substantially radial and a top connecting the first and second flanks,
   wherein the sidewalls abut the first and second flanks along an entire height of the first and second flanks of the rib, and
   wherein the tire includes a chamber delimited by the tread, the sidewalls, and a median portion connecting the sidewalls, and the median portion abuts the top of the rib such that the chamber is entirely disposed radially outward of the top of the rib.

2. The element according to claim 1, wherein the peripheral portion of the rigid base and the second end portion of the sidewalls are arranged with cooperation of form relative to one another.

3. The element according to claim 1, wherein the peripheral portion of the rigid base comprises a plurality of recesses, crud the second end portions of the sidewalls extend at least partly through recesses.

4. The element according to claim 3, wherein at least some of the recesses open in a vicinity of the second end portion of each of the sidewalls, and the tire comprises a junction of material between the sidewalls, and the junction of material passes through at least one of the recesses.

5. The element according to claim 1, wherein the rigid base is wider than the tire.

6. The element according to claim 1, wherein the rigid base has an inner face with a network of ribs which provides the rigid base with an alveolar structure.

7. An agricultural tool comprising at least two pneumatic elements according to claim 1.

8. The tool according to claim 7, comprising, a rim in which at least one base is provided as a peripheral part of the rim.

9. The tool according to claim 8, wherein the peripheral part of the base comprises two circumferential ribs, on each of which a respective tire is over-molded.

10. The tool according to claim 7, wherein the rotary support is generally tubular and elongate, and comprises a plurality of pneumatic elements fitted on the rotary support in a manner which is aligned according to a longitudinal direction of the rotary support.

11. The tool according to claim 10, further comprising a plurality of braces made of flexible material which are interposed between the bases of mutually adjacent pneumatic elements.

12. The tool according to claim 11, wherein the braces have a large lateral face, and the bases have a large lateral face, and the large lateral faces of the braces and the bases have mutually conjugated forms.

13. The tool according to claim 12, wherein the large lateral face of the bases has a beveled edge, the large lateral face of the braces has a beveled surface, and the beveled surface and the beveled edge are mutually conjugated.

* * * * *